US008626062B2

(12) United States Patent
Sachs et al.

(10) Patent No.: US 8,626,062 B2
(45) Date of Patent: Jan. 7, 2014

(54) METHOD AND AN ARRANGEMENT FOR DETERMINING AN ADMISSION CONTROL THRESHOLD

(75) Inventors: Joachim Sachs, Aachen (DE); Jonas Kronander, Uppsala (SE); Olav Queseth, Solna (SE); Tim Irnich, Neuss (DE); Hugo Tullberg, Nyköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 167 days.

(21) Appl. No.: 13/130,445

(22) PCT Filed: Dec. 23, 2008

(86) PCT No.: PCT/SE2008/051562
§ 371 (c)(1),
(2), (4) Date: May 20, 2011

(87) PCT Pub. No.: WO2010/074624
PCT Pub. Date: Jul. 1, 2010

(65) Prior Publication Data
US 2011/0237183 A1    Sep. 29, 2011

(51) Int. Cl.
*H04B 1/06*    (2006.01)

(52) U.S. Cl.
USPC ......... 455/26.1; 455/63.2; 455/445; 455/451; 709/232; 370/254

(58) Field of Classification Search
USPC ........ 455/26.1, 63.2, 445, 451, 454; 370/254, 370/329, 450; 709/232, 234
See application file for complete search history.

(56) References Cited

U.S. PATENT DOCUMENTS

| | | | |
|---|---|---|---|
| 5,826,169 A * | 10/1998 | Natarajan | 455/13.1 |
| 6,704,572 B1 * | 3/2004 | Whinnett et al. | 455/452.1 |
| 7,167,463 B2 * | 1/2007 | Alapuranen | 370/338 |
| 7,369,484 B1 * | 5/2008 | Prismantas et al. | 370/201 |
| 7,650,126 B2 * | 1/2010 | Birru et al. | 455/226.1 |
| 2006/0148482 A1 | 7/2006 | Mangold | |
| 2007/0086379 A1 | 4/2007 | Takayanagi et al. | |
| 2008/0146240 A1 * | 6/2008 | Trudeau | 455/445 |

OTHER PUBLICATIONS

Cordeiro et al, "IEEE 802.22: An Introduction to the First Wireless Standard Based on Cognitive Radios", Journal of Communications, vol. 1, No. 1, Apr. 2006, pp. 38-47.
International Search Report for PCT/SE2008/051562, mailed Oct. 22, 2009.
Written Opinion of the International Search Report for PCT/SE2008/051562, mailed Oct. 22, 2009.

* cited by examiner

*Primary Examiner* — Minh D Dao
(74) *Attorney, Agent, or Firm* — Nixon & Vanderhye, P.C.

(57) ABSTRACT

A method and an arrangement (400) for determining an admission control threshold for use in an admission control procedure are provided. The admission control procedure manages a first spectrum resource (R1). The first spectrum resource (R1) has a first spectrum resource capacity and a first available spectrum resource capacity, wherein the first available spectrum resource capacity has a time dependence. In a step (220), the admission control threshold is determined based on the first spectrum resource capacity and a measure of the time dependence of the first available spectrum resource capacity.

20 Claims, 4 Drawing Sheets

METHOD AND AN ARRANGEMENT FOR DETERMINING AN ADMISSION CONTROL THRESHOLD

This application is the U.S. national phase of International Application No. PCT/SE2008/051562, filed 23 Dec. 2008, which designated the U.S., the entire content of which is hereby incorporated by reference.

TECHNICAL FIELD

The present invention relates to a method and an arrangement for determining an admission control threshold for use in an admission control procedure.

BACKGROUND

Presently, the usage of radio spectrum is liberalized in that frequency bands are sometimes not exclusively assigned to one particular transmission system or in that frequency bands are sometime only assigned to one particular transmission system for a limited period of time. A reason for this is that frequency bands, assigned by licenses to licensees, are often not used during certain periods. For example, one possible approach pursued in regulations is to license the frequency band, or spectrum resource, to a licensee (primary user), while at the same time allow other users, or secondary users, to use the frequency band under the condition that the secondary users do not cause harmful interference to the system operation of the primary user. In future, there will be multitude of spectrum usage regimes applied for different portions of the electro-magnetic spectrum.

A first example of such a usage regime, or spectrum resource usage regime, is dedicated licensed spectrum operation, in which the licensee receives an exclusive license for using a certain spectrum portion, or frequency band, for a certain period of time in a certain region (e.g. 2G/3G cellular communication systems of today).

Further, a second regime is licensed spectrum operation with opportunistic spectrum access by secondary users, in which the primary user receives a non-exclusive license for using a certain spectrum portion for a certain period of time in a certain region, while other systems are allowed to use the licensed spectrum under a secondary license and/or under certain usage rules. For example, the other systems (secondary users) need to sense or detect if the licensee (primary user) is using the spectrum and if primary usage is detected, the secondary user has to withhold from or cease spectrum usage if the interference caused from the secondary system to the primary system exceeds a certain threshold (e.g. secondary usage of white space spectrum in US TV bands, as developed in IEEE 802.22).

Moreover, a third regime is licensed spectrum operation with allowance for spectrum trading, in which the licensee receives an exclusive license for using a certain spectrum portion for a certain period of time in a certain region with the option for renting out the usage of the licensed spectrum in exclusive secondary licenses. For example, a primary licensee has the spectrum usage right for a certain spectrum portion in a specific region for 20 years, but is only using the spectrum at certain time periods. The primary user can then lease the temporal/regional usage of the spectrum resources to secondary users on, for example, a yearly or monthly basis, or only during daily time periods, for example, during night.

In addition, as a variety of the third regime, an exclusive license for using a certain spectrum portion for a certain period of time in a certain region may be provided directly by a spectrum usage regulatory body for providing spectrum licenses, which would correspond to the primary user in the example above.

Furthermore, a fourth regime is un-licensed spectrum operation, in which the usage of a certain spectrum portion in a certain region is allowed to any system which fulfils certain usage policies, such as maximum allowed transmission power or sharing rules.

In an ad-hoc network, the network does not have an infrastructure. An exemplifying ad hoc network comprises a plurality of mobile stations, which may leave or attach to the network at will. Also, in this ad-hoc network there is a need for admission control. In order to perform admission control, one of the mobile stations needs to be configured as an admission control resource management node, a so called super node of the cluster of mobile terminals forming the ad-hoc network. Notably, admission control is hence performed in one of the mobile terminals. Alternatively, admission control may be performed in each mobile terminal.

With the independence of spectrum usage from specific service types (e.g. broadcasting, cellular communication services), it is possible for telecommunication systems to combine the usage of a multitude of spectrum portions, as long as the corresponding spectrum usage regime for each spectrum portion is applied. In such a system, a spectrum resource aggregation function of a mobile network performs aggregation of different spectrum resources and performs common resource management for these resources. One spectrum resource can, for example, be the licensed spectrum of the operator of the mobile network with exclusive usage right according to a dedicated licensed spectrum operation, another spectrum resource can be licensed with a temporarily exclusive usage right according to a secondary license that was bought from another mobile network operator or TV broadcast operator, a third spectrum resource may be non-exclusively licensed by another system (e.g. a TV broadcast operator or a radar system) which is used by the mobile network opportunistically, and a fourth spectrum resource may be an unlicensed spectrum resource that is used by an unknown amount of systems.

Throughout the disclosure of this application, the term "spectrum-on-demand system" shall be understood as comprising a mobile network system, which makes use of spectrum resources that are not assigned to the mobile network operator under a primary exclusive license, possibly but not necessarily, in addition to any primary spectrum resources.

In a spectrum-on-demand system, the resources comprising the different resource components provided by the individual spectrum resources are managed by a common resources management unit or center. This does not exclude that further resource management functions are performed within each system resource, like for example, power control, congestion control and more. This common resource management unit includes functions like admission control of services and service allocation.

Admission control is part of most communication networks. The basic functionality of admission control is to allow as many services into the system as can be supported by the spectrum resources such that the minimum service requirements are still met. If all resources are occupied, any further service requests will be rejected. The following condition needs to be fulfilled at all times:

$$\sum_j s_j \le A_t = C_{tot} - A_m, \qquad (1)$$

where $s_j$ is the amount of resources required for serving a session j, $A_t$ is the admission threshold denoting the maximum amount of occupied resources before admission control rejects the admittance of new services, $C_{tot}$ is the total capacity of resources managed by the admission control and $A_m$ is an admission control margin. The admission control threshold compensates that the amount of resources required for a service $s_j$ is not constant, as it may change e.g. with fluctuations of the radio channel due to mobility, fading or varying interference, or user mobility. An admission control margin, $A_m$ balances this uncertainty/estimation error. In addition, the admission control margin, $A_m$ can be used to account for fractional loading requirements, i.e., when a given gross capacity cannot be loaded to 100% due to Quality of Service (QoS) requirements of the carried traffic. The total capacity $C_{tot}$ depends on the resources that are allocated to the system. In mobile networks, total capacity is capacity of the spectrum resource allocated to the used access technology. Mobile networks may also combine a multitude of spectrum resources. This is, for example, the case when a mobile network operator has different spectrum licenses for different spectrum portions and uses the same access technology on multiple carriers. As a further example, a mobile network operator may have different spectrum licenses for different spectrum portions, in which it operates different access technologies like a GSM/EDGE Radio Access Network in the GSM frequency band, a UMTS Radio Access Network in the UMTS frequency band, and a LTE Radio Access Network in new IMT frequency bands. As shown in FIG. 2, the total capacity that is used for admission control in such a system with multiple spectrum resources is determined as the sum of the capacities of the different spectrum resources.

Using this common admission control approach for multiple spectrum resources in a spectrum-on-demand system may cause service degradation or inefficient utilization of spectrum resources. Hence, there is a need for an improved procedure for determining the admission control threshold.

SUMMARY

An object of the present invention is to improve reliability of a service of a spectrum on demand system.

According to an aspect of the invention, the object is achieved by a method for determining an admission control threshold for use in an admission control procedure of a first radio communication system. The admission control procedure manages a first spectrum resource, wherein the first spectrum resource (R1) has a first spectrum resource capacity and a first available spectrum resource capacity. The first available spectrum resource capacity is available for use by the first radio communication system and the first available spectrum resource capacity has a time dependence. In a step, the admission control procedure determines the admission control threshold based on the first spectrum resource capacity and a measure of the time dependence of the first available spectrum resource capacity.

It shall be noted that the term "capacity" or "spectrum resource capacity" is intended to be interpreted as capacity of a spectrum resource, as defined by a frequency range or a bandwidth of the spectrum resource. Hence, the capacity of a spectrum resource does not vary with an amount of services using the spectrum resource. Expressed differently, the spectrum resource capacity is independent of a number of user equipments using the spectrum resource at issue. Nevertheless, an "available capacity of a spectrum resource", "available spectrum resource capacity" or "availability of a spectrum resource capacity" may vary due to, for example, license agreements, as described above. Thus, available capacity of a spectrum resource may vary in time. Expressed differently, an available capacity of a spectrum resource has time dependence. In this context, the terms "available" and "availability", when used in conjunction with capacity to form the expression "available capacity" and "availability of a spectrum resource capacity" is the spectrum resource capacity reduced by capacity occupied by other communications systems than the one at issue, i.e. the first radio communication system. The spectrum resource capacity may be occupied due to license agreements that are limited in time or usage by other communication systems.

Notably, available spectrum resource capacity is greater than (or equal to) free spectrum resource capacity, which may be used by a service of the first radio communication system. "Equal to" applies to the case when no services are active. For the purpose of indicating free spectrum resource capacity, the terms "free capacity" and "remaining capacity" of a spectrum resource may be used.

According to another aspect of the invention, the object is achieved by an arrangement for determining an admission control threshold for use in an admission control procedure of a first radio communication system. The admission control procedure manages a first spectrum resource, wherein the first spectrum resource has a first spectrum resource capacity and a first available spectrum resource capacity. The first available spectrum resource capacity is available for use by the first radio communication system and the first available spectrum resource capacity has a time dependence. The arrangement comprises a determining unit configured to determine the admission control threshold based on the first spectrum resource capacity and a measure of the time dependence of the first available spectrum resource capacity.

Since the admission control threshold is determined based on the first spectrum resource capacity and a measure of the time dependence of the first available spectrum resource capacity, an improved measure of a first available spectrum resource capacity, having a time dependence (time variance), is obtained. In this manner, availability in time of the first spectrum resource capacity in addition to the capacity of the spectrum resource is taken into account when determining a total system capacity for use in an admission control procedure. Thus, it is ensured that a spectrum resource, utilized by a service, is reliably available for at least a certain period of time. Preferably, the period is long enough for a service, executed in the first radio communication system, to finish its operation. As a result, the present solution provides improved reliability of a service of a spectrum on demand system.

Advantageously, the present solution provides means for how admission control may be applied to a spectrum-on-demand system, in which spectrum resources are aggregated within a mobile network, and in which spectrum resources may have different availability according to different spectrum usage regimes like opportunistic spectrum access, secondary spectrum licenses and/or un-licensed spectrum access.

Further features of, and advantages with, the present invention will become apparent when studying the appended claims and the following description. Those skilled in the art realize that different features of the present invention may be combined to create embodiments other than those described in the following, without departing from the scope of the present invention, as defined by the appended claims.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
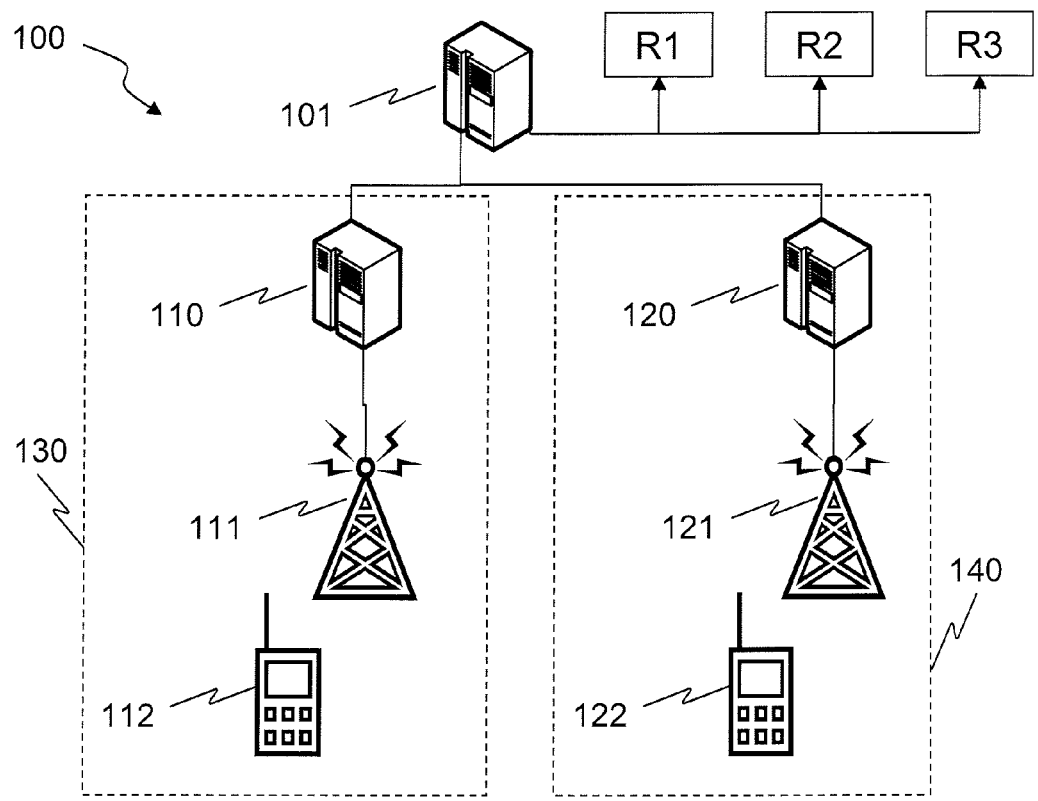
FIG. 1 shows an exemplifying system in which a plurality of spectrum resources are used by different radio communication networks.

Throughout the following description similar reference numerals have been used to denote similar elements, parts, items or features, when applicable.

It is to be understood that the term "core network node" includes, but is not limited to, a mobility management entity (MME), an operations and support system (OSS) or the like. Further, it is to be understood that the term "communication device" includes, but is not limited to, a mobile terminal, a mobile station, a user equipment, a personal digital assistant or the like.

FIG. 1 shows an exemplifying telecommunication system 100, in which a plurality of spectrum resources R1, R2, R3 are used by two radio communication networks 130, 140. The telecommunication system 100 comprises a radio resource management node 101 configured to manage a set of spectrum resources, comprising said plurality of spectrum resources R1, R2, R3. At least one of the spectrum resources has a first spectrum resource capacity and a first available spectrum resource capacity. The first available spectrum resource capacity has a time dependence. Furthermore, in this example, it is assumed that none of the spectrum resources R1, R2, R3 is licensed under an exclusive license. A first radio communication network 130, also in FIG. 1, comprises a first core network node 110, a first radio base station 111 and a first communication device 112. A second radio communication network 140, also in FIG. 1, comprises a second core network node 120, a second radio base station 121 and a second communication device 122.

It is to be understood that the radio resource management node may be a mobile terminal, a radio base station or a dedicated radio resource management network node or the like.

Another exemplifying telecommunication system, not shown, comprises a plurality of core network nodes forming a core network. A plurality of radio access networks shares the core network, wherein each radio access network comprises a number of radio base stations. In this example, the core network may comprise, or be co-located with, the radio resource management node. Alternatively, the radio resource management node may be comprised in a management network, connecting to all nodes in the radio access network(s). Moreover, the radio resource management node may be included in one of the radio access networks, for example, as included or co-located with a radio base station. It may be preferred that the radio resource management node is directly connected to the radio base stations, not necessarily via a core network node.

Figure 2:
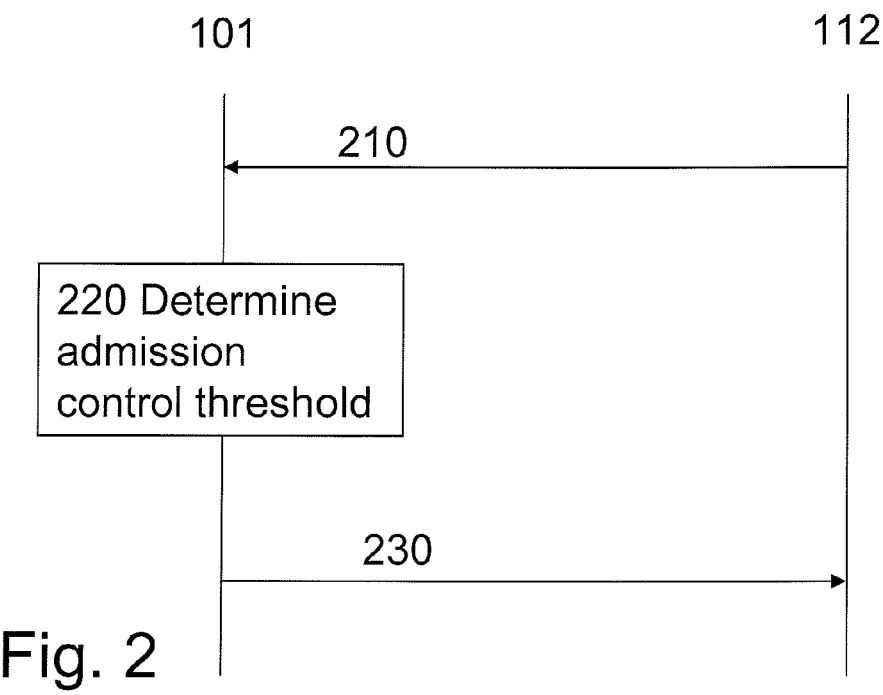
FIG. 2 shows a combined signalling and flow chart of the system in FIG. 1 in operation.

With reference to FIG. 2, there is shown a simplified combined signalling and flow chart of the system 100 in operation. The following steps may be performed. 210 Optionally, in a step 210, the communication device 112 sends a service request to the radio resource management node 101 via the first core network node 110 and the first radio base station 111.

In some embodiments, the service request may be triggered by the network, for example, in the form of an incoming multi-media session setup. In this case, the step 210 may be omitted.

In some embodiments, the service request may be triggered by a change of the number of spectrum resources assigned to the radio resource management node 101. For example, when a spectrum resource is added (for example, due to a short term spectrum license or the discovery of unused spectrum resources) or deleted (for example to due the expiry of a short term spectrum license or the detection of a primary spectrum user becoming active), the radio resource management node 101 will need to update the value of the admission control threshold.

220 In a step 220, the radio resource management node 101 determines the admission control threshold based on the capacities of said plurality of spectrum resources and a measure of any time dependence of availability of the capacities of said plurality of spectrum resources.

230 In a step 230, the radio resource management node 101 assigns at least one of said plurality of spectrum resources to the service executed in the communication device 112, if a capacity, calculated as the sum of capacities occupied by services already allowed to access one or more of said plurality of spectrum resources, is less than the admission control threshold. Optionally, more than one spectrum resource may be assigned to a service.

In some embodiments of the method in the system 100, the radio resource management node 101 and/or the first core network node 110 may be configured with information about usage regimes (being dependent on a license agreement or the like) applied for said plurality of spectrum resources.

In some embodiments of the method in the system 100, the first core network node 110 performs the step 220. For example, this may be the case if the first core network node 110 has been configured with information about usage regimes applied to any one of the spectrum resources.

In some embodiments of the method in the system 100, the radio resource management node 101 comprises the first radio base station 111 and/or the first core network node 110. Expressed differently, the radio resource management node 101 may be co-located in the first radio base station 111 and/or the first core network node 110.

In some embodiments of the method in the system 100, it is assumed that admission control, using the proposed method of determining an admission control threshold, only is applied to services with minimum service requirements (in 3GPP terms, only services for which bearers with Guaranteed Bit Rate (GBR) are used). Other services without GBR bearers (i.e. best-effort services) can be admitted to use any spare capacity.

Figure 3:
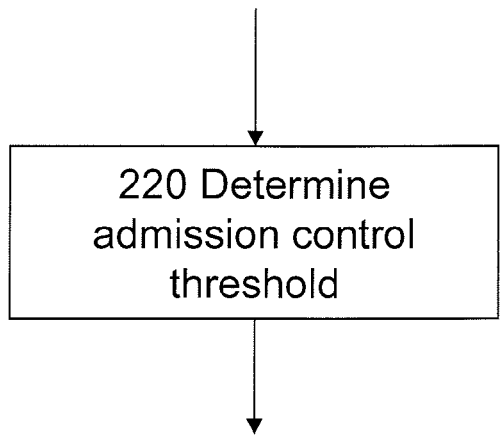
FIG. 3 shows a flow chart of an embodiment of the method according to the present invention.

FIG. 3 shows a flow chart of an embodiment of the method for determining an admission control threshold for use in an admission control procedure of a first radio communication system. A radio resource management node 101, 110, 111 may, optionally, be comprised in the first radio communication system 100. The admission control procedure manages at least one first spectrum resource R1. Said at least one first spectrum resource R1 has a first spectrum resource capacity and a first available spectrum resource capacity, wherein the first available spectrum resource capacity has a time dependence. A user equipment 112 may, optionally, be comprised in the radio communication system 100. Optionally, the user equipment may execute a service which requires at least a portion of the first spectrum resource capacity. The following steps may be performed.

220 In a step 220, the admission control threshold is determined based on the first spectrum resource capacity and a measure of the time dependence of the first available spectrum resource capacity.

It may be noted that the radio resource management node 101, 110, 111 may be a mobile terminal, a radio base station or a dedicated resource management network node.

In some embodiments of the method, optionally in the radio resource management node 101, 110, 111, the time dependence of said at least one first available spectrum resource capacity depends on assignment of said at least one spectrum resource R1 to the admission control procedure for a limited period of time. The assignment may be limited to a period of time due to license agreements or a primary user being in-active. Preferably, the period of time is less than one year, most preferably, the period of time is in the range of hours or months.

In some embodiments of the method, optionally in the radio resource management node 101, 110, 111, the measure of the time dependence of the first available spectrum resource capacity is based on average availability of the first spectrum resource capacity in time.

In some embodiments of the method, optionally in the radio resource management node 101, 110, 111, the average availability of the first spectrum resource capacity in time corresponds to a percentage of a time period, wherein the percentage indicates a portion of the time period during which the first spectrum resource capacity is available for use by the first radio communication system.

In some embodiments of the method, optionally in the radio resource management node 101, 110, 111, the measure of the time dependence of the first available spectrum resource capacity is based on temporal characteristics of the first available spectrum resource capacity R1.

In some embodiments of the method, optionally in the radio resource management node 101, 110, 111, the temporal characteristics of the first available spectrum resource capacity R1 are regulated by a license agreement for the first spectrum resource.

In some embodiments of the method, optionally in the radio resource management node 101, 110, 111, the measure of the time dependence of the first spectrum resource capacity is based on spectrum regime used and/or policies applied for the first spectrum resource capacity.

In some embodiments of the method, optionally in the radio resource management node 101, 110, 111, the spectrum regime used and/or policies applied is/are regulated by license agreements and/or rules for sharing spectrum resources.

In some embodiments of the method, optionally in the radio resource management node 101, 110, 111, the measure of the time dependence of the first available spectrum resource capacity is based on predictability of the first available spectrum resource capacity.

In some embodiments of the method, optionally in the radio resource management node 101, 110, 111, predictability of the first available spectrum resource capacity is derived from predictability of interference from a radar station.

In some embodiments of the method, optionally in the radio resource management node 101, 110, 111, the measure of the time dependence of the first available spectrum resource capacity is based on average availability of the first spectrum resource capacity in time, temporal characteristics of the first spectrum resource capacity R1, spectrum regime used and/or policies applied for the first spectrum resource capacity, or predictability of the first spectrum resource capacity, or a combination thereof.

In some embodiments of the method, optionally in the radio resource management node 101, 110, 111, the admission control procedure manages at least one second spectrum resource R2, having a second spectrum resource capacity and a second available spectrum resource capacity.

In some embodiments of the method, optionally in the radio resource management node 101, 110, 111, the second spectrum resource capacity is reliably available for use by the user equipment 112. Optionally, the second spectrum resource capacity may be constantly available for use by the user equipment 112. As an example, this is the case, when the radio resource management node manages one spectrum resource obtained by an exclusive license and a second spectrum resource obtained due to a primary user not being active.

In some embodiments of the method, optionally in the radio resource management node 101, 110, 111, the second available spectrum resource capacity has a second time dependence. As an example, this is the case when the radio resource management node manages a first spectrum resource obtained by a short term secondary license and a second spectrum resource obtained due to a primary user not being active.

In some embodiments of the method, optionally in the radio resource management node 101, 110, 111, the admission control threshold is further based on the second spectrum resource capacity and a measure of the time dependence of the second available spectrum resource capacity.

Figure 4:
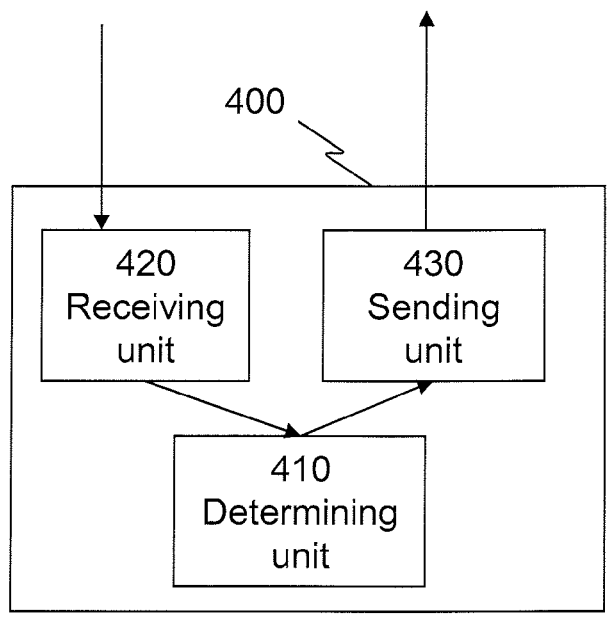
FIG. 4 shows a schematic block diagram of an embodiment of the arrangement according to the present invention.

FIG. 4 shows a schematic block diagram of an embodiment of an arrangement 400 for determining an admission control threshold for use in an admission control procedure of a first radio communication system 100. A radio resource management node 101, 110, 111 may, optionally, be comprised in the radio communication system 100. The admission control procedure manages at least one first spectrum resource R1. Said at least one first spectrum resource R1 has a first spectrum resource capacity and a first available spectrum resource capacity, wherein the first available spectrum resource capacity has a time dependence. A user equipment 112 may, optionally, be comprised in the radio communication system 100. Optionally, the user equipment may execute a service which requires at least a portion of the first available spectrum resource capacity. Furthermore, the arrangement comprises a determining unit 410 configured to determine the admission control threshold based on the first spectrum resource capacity and a measure of the time dependence of the first available spectrum resource capacity. Optionally, the arrangement may comprise a sending unit 430 and a receiving unit 420.

It may be noted that the radio resource management node 101, 110, 111 may be a mobile terminal, a radio base station or a dedicated resource management network node.

In some embodiments of the arrangement 400, optionally in the radio resource management node 101, 110, 111, the time dependence of said at least one first available spectrum resource capacity depends on assignment of said at least one spectrum resource R1 to the admission control procedure for a limited period of time. The assignment may be limited to a period of time due to license agreements or a primary user being in-active. Preferably, the period of time is less than one year; most preferably, the period of time is in the range of hours or months.

In some embodiments of the arrangement 400, optionally in the radio resource management node 101, 110, 111, the measure of the time dependence of the first available spectrum resource capacity is based on average availability of the first spectrum resource capacity in time.

In some embodiments of the arrangement 400, optionally in the radio resource management node 101, 110, 111, the average availability of the first spectrum resource capacity in time corresponds to a percentage of a time period, wherein the percentage indicates a portion of the time period during which the first spectrum resource capacity is available for use by the first radio communication system.

In some embodiments of the arrangement 400, optionally in the radio resource management node 101, 110, 111, the measure of the time dependence of the first available spectrum resource capacity is based on temporal characteristics of the first available spectrum resource capacity R1.

In some embodiments of the arrangement 400, optionally in the radio resource management node 101, 110, 111, the temporal characteristics of the first available spectrum resource capacity R1 are regulated by a license agreement for the first spectrum resource.

In some embodiments of the arrangement 400, optionally in the radio resource management node 101, 110, 111, the measure of the time dependence of the first spectrum resource capacity is based on spectrum regime used and/or policies applied for the first spectrum resource capacity.

In some embodiments of the arrangement 400, optionally in the radio resource management node 101, 110, 111, the spectrum regime used and/or policies applied is/are regulated by license agreements and/or rules for sharing spectrum resources.

In some embodiments of the arrangement 400, optionally in the radio resource management node 101, 110, 111, the measure of the time dependence of the first available spectrum resource capacity is based on predictability of the first available spectrum resource capacity.

In some embodiments of the arrangement 400, optionally in the radio resource management node 101, 110, 111, predictability of the first available spectrum resource capacity is derived from predictability of interference from a radar station.

In some embodiments of the arrangement 400, optionally in the radio resource management node 101, 110, 111, the measure of the time dependence of the first available spectrum resource capacity is based on average availability of the first spectrum resource capacity in time, temporal characteristics of the first spectrum resource capacity R1, spectrum regime used and/or policies applied for the first spectrum resource capacity, or predictability of the first spectrum resource capacity, or a combination thereof.

In some embodiments of the arrangement 400, optionally in the radio resource management node 101, 110, 111, the admission control procedure further is configured to manage at least one second spectrum resource R2, having a second spectrum resource capacity and a second available spectrum resource capacity.

In some embodiments of the arrangement 400, optionally in the radio resource management node 101, 110, 111, the second spectrum resource capacity is reliably available for use by the user equipment 112. Optionally, the second spectrum resource capacity may be constantly available for use by the user equipment 112. As an example, this is the case, when the radio resource management node manages one spectrum resource obtained by an exclusive license and a second spectrum resource obtained due to a primary user not being active.

In some embodiments of the arrangement 400, optionally in the radio resource management node 101, 110, 111, the second available spectrum resource capacity has a second time dependence. As an example, this is the case when the radio resource management node manages a first spectrum resource obtained by a short term secondary license and a second spectrum resource obtained due to a primary user not being active.

In some embodiments of the arrangement 400, optionally in the radio resource management node 101, 110, 111, the admission control threshold is further based on the second spectrum resource capacity and a measure of the time dependence of the second available spectrum resource capacity.

Figure 5:
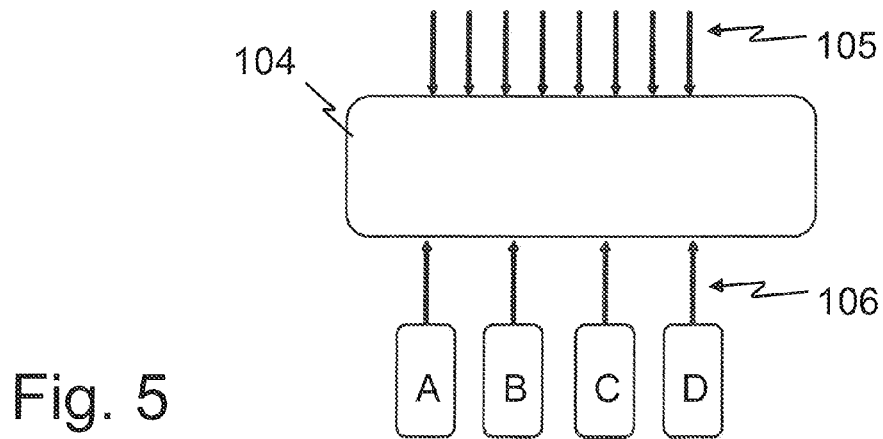
FIG. 5 shows a schematic block diagram of a radio resource management center or radio resource management node, FIG. 6 demonstrates an exemplifying scenario in which the present solution may be applied.

FIG. 5 shows a schematic block diagram of a radio resource management center 104, or radio resource management node 104. Arrows 105 indicate service requests from communication devices, which have attached to the system 100 in FIG. 1. The radio resource management node 104 manages a number of spectrum resources A, B, C and D, as indicated by arrows 106. The radio resource management node 104 assigns one or more spectrum resources A, B, C, and D to a service requesting to access one or more spectrum resources.

In order to handle available spectrum resource capacities, which have a time variance, or time dependence, a reliability factor $\rho_i$ is introduced. The reliability factor may depend on the spectrum usage regime of the spectrum resource, e.g. a spectrum resource with exclusive license has $\rho_i=1$, and/or time variation of available spectrum resource capacity (e.g. average, variance, deterministic knowledge from secondary license). If the primary user utilizes the spectrum only for a portion of a certain period of time, the reliability factor $\rho_i$ may be set to a percentage being determined as the ratio of the portion of the certain period of time to the certain period of time. Then, the spectrum resource may be considered to be "statistically reliably" for a time being equal the certain period of time multiplied by the percentage.

Figure 6:
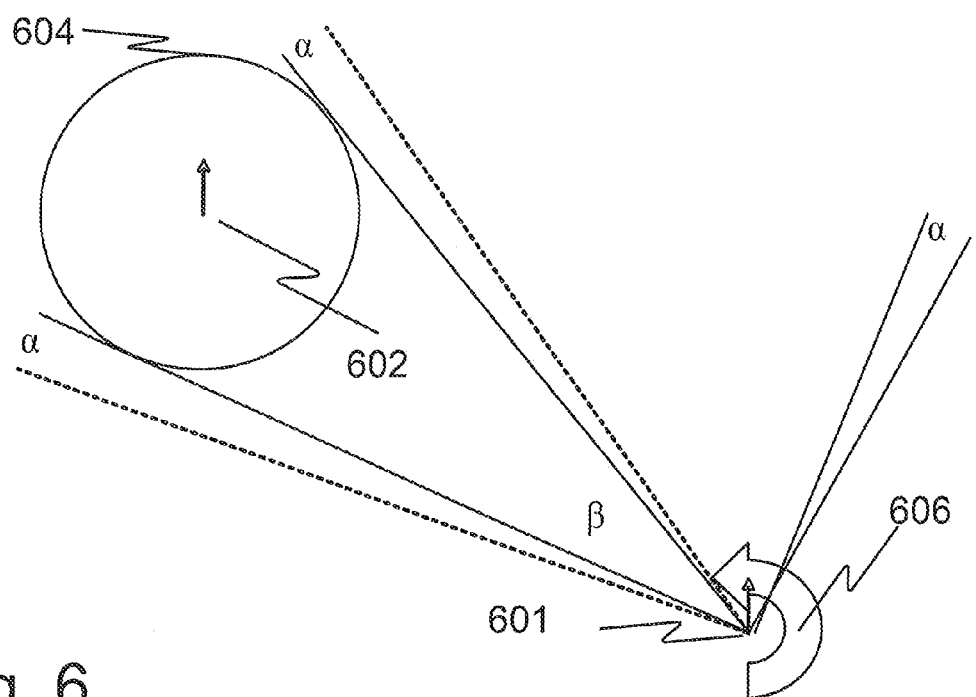

In FIG. 6, there is illustrated a radar station 601 and a base station 602. The radar station 601 is in this scenario is a primary user and the base station 602 is a secondary user. The radar station 601 has a rotating beam, as indicated by an arrow 606, with a certain width angle $\alpha$, and a spectrum resource of the rotating beam has to be vacated when the rotating beam crosses the coverage area 604 of the base station 602. Optionally, the width angle $\alpha$ comprises a margin in addition to the width of the rotating beam. In this manner, chances of interference between the rotation beam and the base station is reduced further, since the rotating beam is required to be located not only merely out side the coverage area 604, but also a certain margin distance (derivable from the margin added to the angle $\alpha$) away from the coverage area 604. If the rotation frequency of the beam is f, the time the radar beam needs to cross an exclusion sector being equal to $(\alpha+\beta)/(2*pi*f)$. A reliability factor, $\rho_i$, would then be calculated as $1-(\alpha+\beta)/(2*pi)$.

In some embodiments, the system accesses spectrum resources that it has leased (rented) from a primary system, having a license with allowance for spectrum trading. In this case, the reliability factor of the spectrum band will be equal to one during the time the spectrum is leased and set to zero when the leasing period expires.

In a system which uses opportunistic access to the spectrum bands, i.e. uses spectrum sensing to determine if the primary user is active or not, the probability of missed detection, $\rho_m$, should be considered when deciding on the availability of the bands. The secondary system fails in the spectrum sensing in such a way that it misses that the primary system is active in the band. The result of this will be that the secondary system will erroneously consider the band to be free for use. By weighting the fraction of time the system perceives the primary system to be active in the band, $\hat{\rho}_i$, by a factor that compensate for the uncertainty in the detection, that is $$\rho_i = (1-p_m)\hat{\rho}_i, \quad (2)$$

the secondary system takes into account the possibility that spectrum usage by the primary system may be missed.

In case of, for example, a TV broadcasting network as primary user, the spectrum usage pattern of the primary user may be regarded as quasi-static. If it is then further assumed that any change to the spectrum usage pattern would be announced well in advance before becoming effective, the reliability factor would be set to one until the beginning of a certain (previously agreed) "transition period" that is needed/desired by the primary user e.g. in order to set up and test equipment, etc. Starting with the transition period, the reliability factor would be set to 0.

Figure 7:
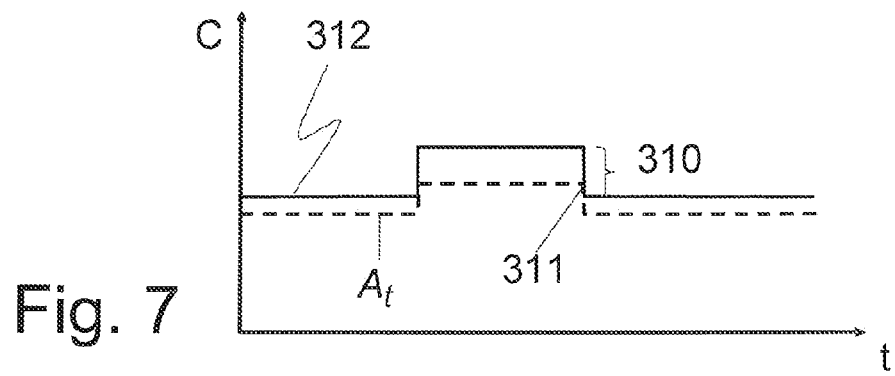
FIGS. 7-9 show some examples on procedures for admission control and corresponding admission control thresholds.

FIG. 7 shows an exemplifying implementation of the present solution, in which the admission control threshold $A_t$ for a spectrum-on-demand system with N spectrum resources is determined as $$A_t = \left(\sum_{i=1}^{N} \rho_i \cdot C_i\right) - A_m \quad (3)$$

In this formula, the capacity provided by a spectrum resource, that is the capacity as defined by the bandwidth of the spectrum resource, is multiplied by the reliability factor, $\rho_i$. In this manner, only the portion of the spectrum resource capacity that is "statistically reliable" contributes to the total capacity. As described above, this portion may be referred to as available spectrum resource capacity. The solid line 312 indicates the total amount of capacity available and the dashed line $A_t$ indicates how the admission threshold varies with time. For example, if the spectrum resource capacity is available for one hour out of two hours, the value of the reliability factor would be 0.5. As a consequence, in the extreme case that suddenly all non-reliable spectrum resources, contributing with capacity denoted 310, would vanish, it may happen that some GBR services are dropped, as indicated by an arrow 311. However, the statistical reliability of the spectrum resources should ensure that in typical scenarios all GBR services can be supported.

Figure 8:
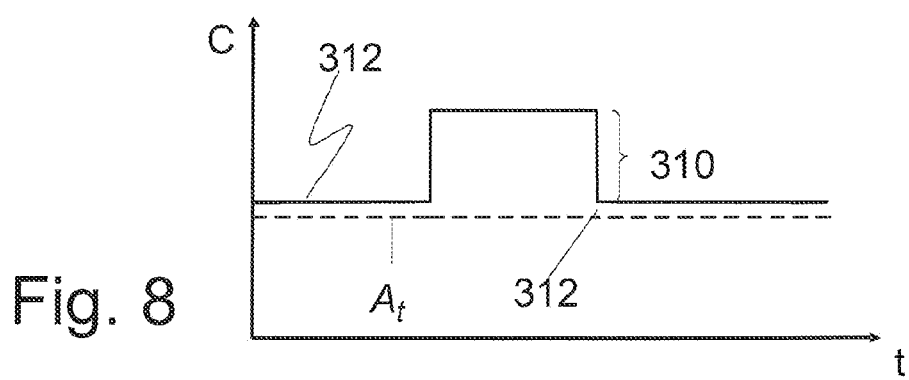

FIG. 8 shows a further exemplifying implementation of the present solution, in which the admission control threshold $A_t$ (dashed line) for a spectrum-on-demand system with N spectrum resources is determined as $$A_t = \left(\sum_{i \in N'} \rho_i \cdot C_i\right) - A_m, \quad \text{with } N' = \{i : \rho_i = 1\} \quad (4)$$

In this formula only guaranteed or reliable spectrum resources contributes to the determination of the admission control threshold. The non-reliable spectrum resources indicated by 310, which may be time varying, are only used to increased performance of GBR and/or Non-GBR services. As a consequence, only spectrum resource capacities that are reliable at all times, i.e. are not time varying, add to the calculation of the admission control threshold. When the non-reliable spectrum resources vanish no dropping of GBR services will occur, see arrow 312. It may be noted that this example may be considered as a special case of the example in FIG. 7. The example shown in FIG. 8 may be achieved if $\rho_i$, in the example of FIG. 7, is set to zero in case that the reliability $\hat{\rho}_i$ is below a certain reliability threshold.

Figure 9:
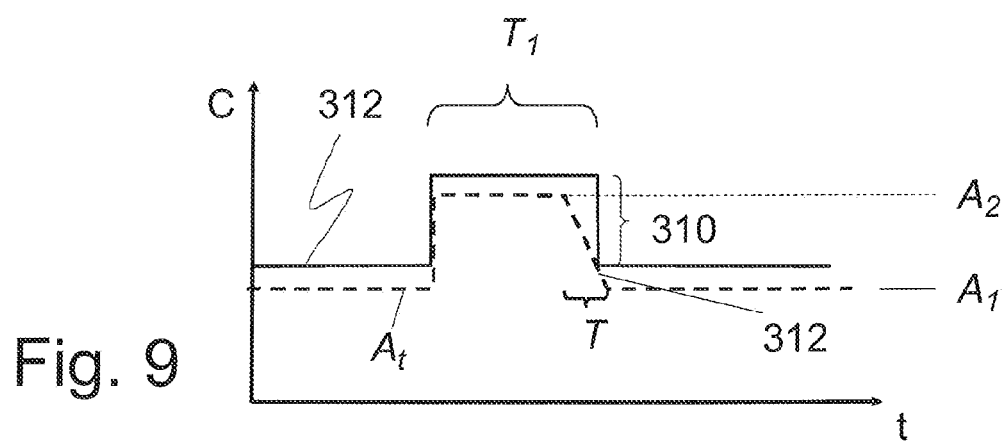

With reference to FIG. 9, there is shown a further example on how the present solution may be implemented in a procedure for determining an admission control threshold and for controlling admission of a service requesting to use a spectrum resource. $A_t$ is deterministically adapted to the deterministic availability of on-demand spectrum resources, as e.g. specified in a secondary license. For example, the secondary spectrum resource may be counted as a reliable spectrum resource in a first time interval, $T_1$-T, and its reliability is steadily decreased in the time span T before the expiry of the secondary license. In this manner, the probability of dropping of GBR services may be kept low, since the slope of $A_t$ is preferably adjusted such that most services may finish before the system runs out of spectrum resource capacity.

In some embodiments, it may be preferred that $A_t$ is set to a level $A_1$ an additional time period before the end of time period $T_1$. Thus, the additional time period before expiry of the time period $T_1$ provides further time for services to finish operation. Thereby, reliability of the services may be further improved.

Even though the invention has been described with reference to specific exemplifying embodiments thereof, many different alterations, modifications and the like will become apparent for those skilled in the art. The described embodiments are therefore not intended to limit the scope of the invention, which is defined by the appended claims.

The invention claimed is:

1. A method for determining an admission control threshold for use in an admission control procedure of a first radio communication system, wherein the admission control procedure manages a first spectrum resource, wherein the first spectrum resource has a first spectrum resource capacity and a first available spectrum resource capacity, being available for use by the first radio communication system, wherein the first available spectrum resource capacity has a time dependence, the method comprising
determining the admission control threshold based on the first spectrum resource capacity and a measure of the time dependence of the first available spectrum resource capacity.

2. The method according to claim 1, wherein the time dependence of the first available spectrum resource capacity depends on assignment of the first spectrum resource to the admission control procedure for a specified period of time.

3. The method according to claim 1, wherein the measure of the time dependence of the first available spectrum resource capacity is based on average availability of the first spectrum resource capacity in time.

4. The method according to claim 3, wherein the average availability of the first spectrum resource capacity in time corresponds to a percentage of a time period, wherein the percentage indicates a portion of the time period during which the first spectrum resource capacity is available for use by the first radio communication system.

5. The method according to claim 1, wherein the measure of the time dependence of the first available spectrum resource capacity is based on temporal characteristics of the first available spectrum resource capacity.

6. The method according to claim 5, wherein the temporal characteristics of the first available spectrum resource capacity are regulated by a license agreement for the first spectrum resource.

7. The method according to claim 1, wherein the measure of the time dependence of the first spectrum resource capacity is based on spectrum regime used and/or policies applied for the first spectrum resource capacity.

8. The method according to claim 7, wherein the spectrum regime used and/or policies applied is/are regulated by license agreements and/or rules for sharing spectrum resources.

9. The method according to claim 1, wherein the measure of the time dependence of the first available spectrum resource capacity is based on predictability of the first available spectrum resource capacity.

10. The method according to claim 9, wherein predictability of the first available spectrum resource capacity is derived from predictability of interference from a radar station.

11. The method according to claim 1, wherein the method is performed in a radio resource management node.

12. The method according to claim 1, wherein the admission control procedure manages at least one second spectrum resource, having a second spectrum resource capacity and a second available spectrum resource capacity.

13. The method according to claim 12, wherein the second available spectrum resource capacity is constantly available for use by the user equipment.

14. The method according to claim 12, wherein the second available spectrum resource capacity has a second time dependence.

15. The method according to claim 14, wherein the admission control threshold further is based on the second spectrum resource capacity and a measure of the time dependence of the second available spectrum resource capacity.

16. An arrangement for determining an admission control threshold for use in an admission control procedure of a first radio communication system, wherein the admission control procedure manages a first spectrum resource, wherein the first spectrum resource has a first spectrum resource capacity and a first available spectrum resource capacity, being available for use by the first radio communication system, wherein the first available spectrum resource capacity has a time dependence, the arrangement comprising a determining unit configured to determine the admission control threshold based on the first spectrum resource capacity and a measure of the time dependence of the first available spectrum resource capacity.

17. The arrangement according to claim 16, wherein the measure of the time dependence of the first available spectrum resource capacity is based on average availability of the first spectrum resource capacity in time.

18. The arrangement according to claim 16, wherein the measure of the time dependence of the first available spectrum resource capacity is based on temporal characteristics of the first available spectrum resource capacity.

19. The arrangement according to claim 16, wherein the measure of the time dependence of the first spectrum resource capacity is based on spectrum regime used and/or policies applied for the first spectrum resource capacity.

20. The arrangement according to claim 16, wherein the measure of the time dependence of the first available spectrum resource capacity is based on predictability of the first available spectrum resource capacity.

* * * * *

UNITED STATES PATENT AND TRADEMARK OFFICE
CERTIFICATE OF CORRECTION

PATENT NO.        : 8,626,062 B2                             Page 1 of 1
APPLICATION NO.   : 13/130445
DATED             : January 7, 2014
INVENTOR(S)       : Sachs et al.

It is certified that error appears in the above-identified patent and that said Letters Patent is hereby corrected as shown below:

In the Specification

In Column 6, Line 15, delete "to due the" and insert -- due to the --, therefor.

Signed and Sealed this
Eighth Day of July, 2014

Michelle K. Lee
*Deputy Director of the United States Patent and Trademark Office*